Nov. 24, 1964 C. B. TRIMBLE 3,158,305
RECORD MEDIA HANDLING APPARATUS
Filed March 14, 1960 7 Sheets-Sheet 1

INVENTOR
CEBERN B. TRIMBLE

BY
*Louis A. Kline*
*Albert L. Sessler, Jr.*
HIS ATTORNEYS

Nov. 24, 1964　　　C. B. TRIMBLE　　　3,158,305
RECORD MEDIA HANDLING APPARATUS
Filed March 14, 1960　　　　　　　　　　　7 Sheets-Sheet 2
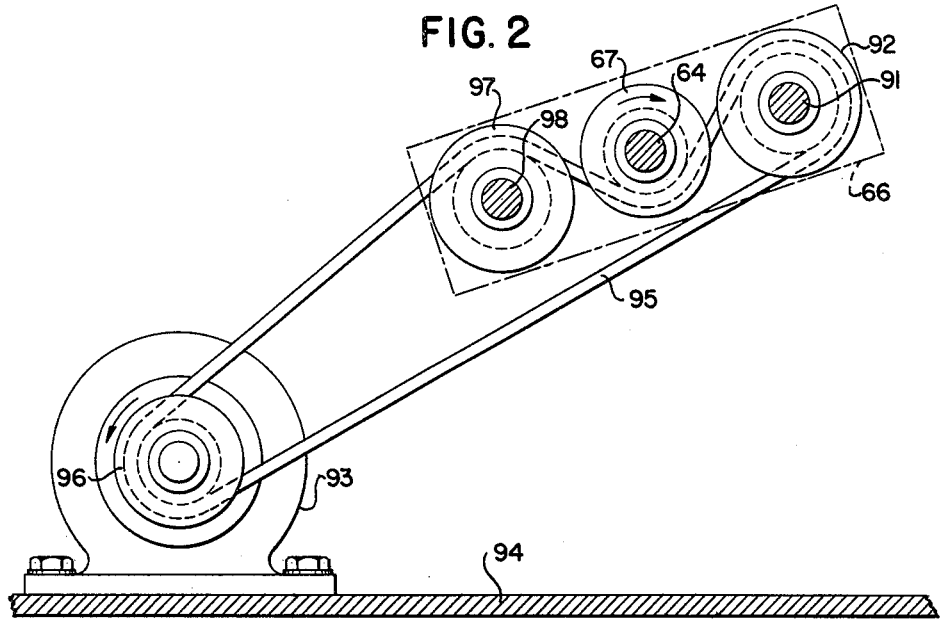
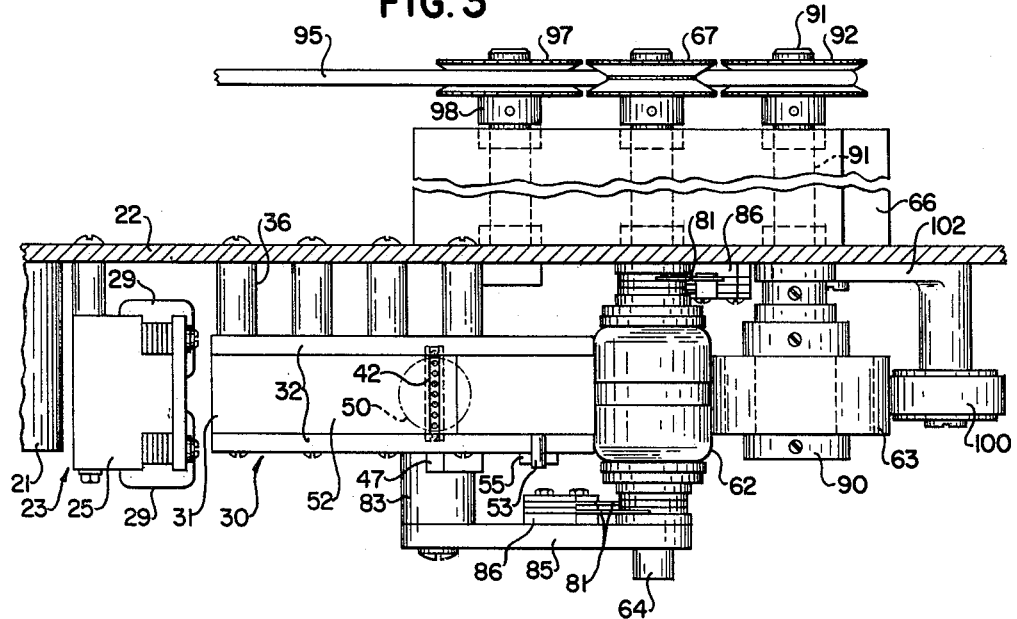
INVENTOR
CEBERN B. TRIMBLE
BY
HIS ATTORNEYS

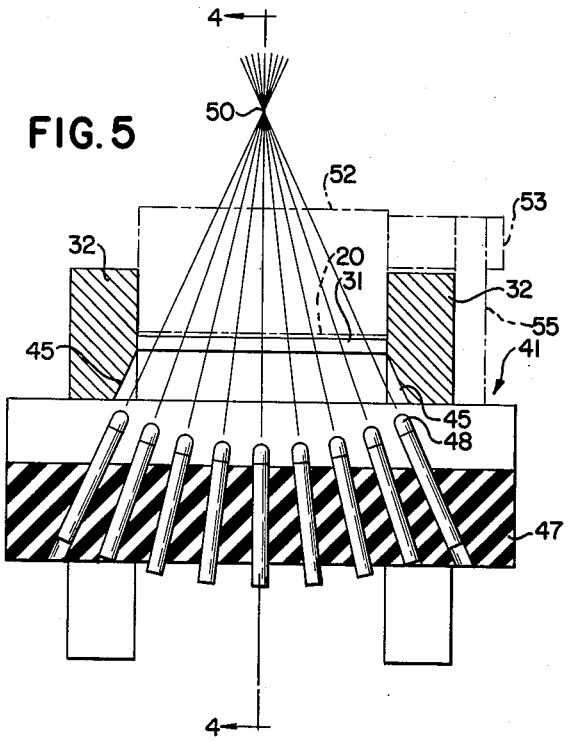
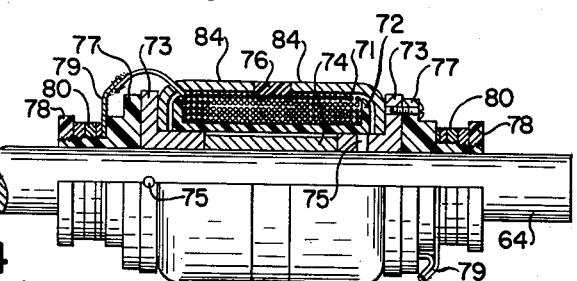
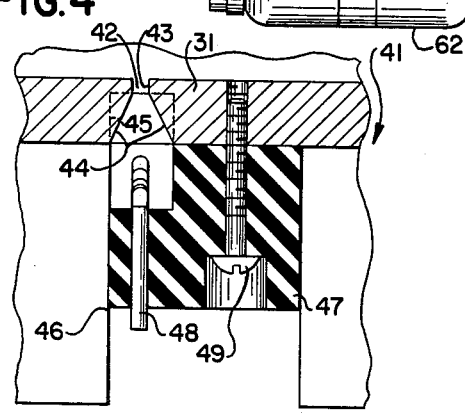

Nov. 24, 1964     C. B. TRIMBLE     3,158,305
RECORD MEDIA HANDLING APPARATUS
Filed March 14, 1960     7 Sheets-Sheet 4

INVENTOR
CEBERN B. TRIMBLE

BY
Louis A. Kline
Albert L. Sessler, Jr.
HIS ATTORNEYS

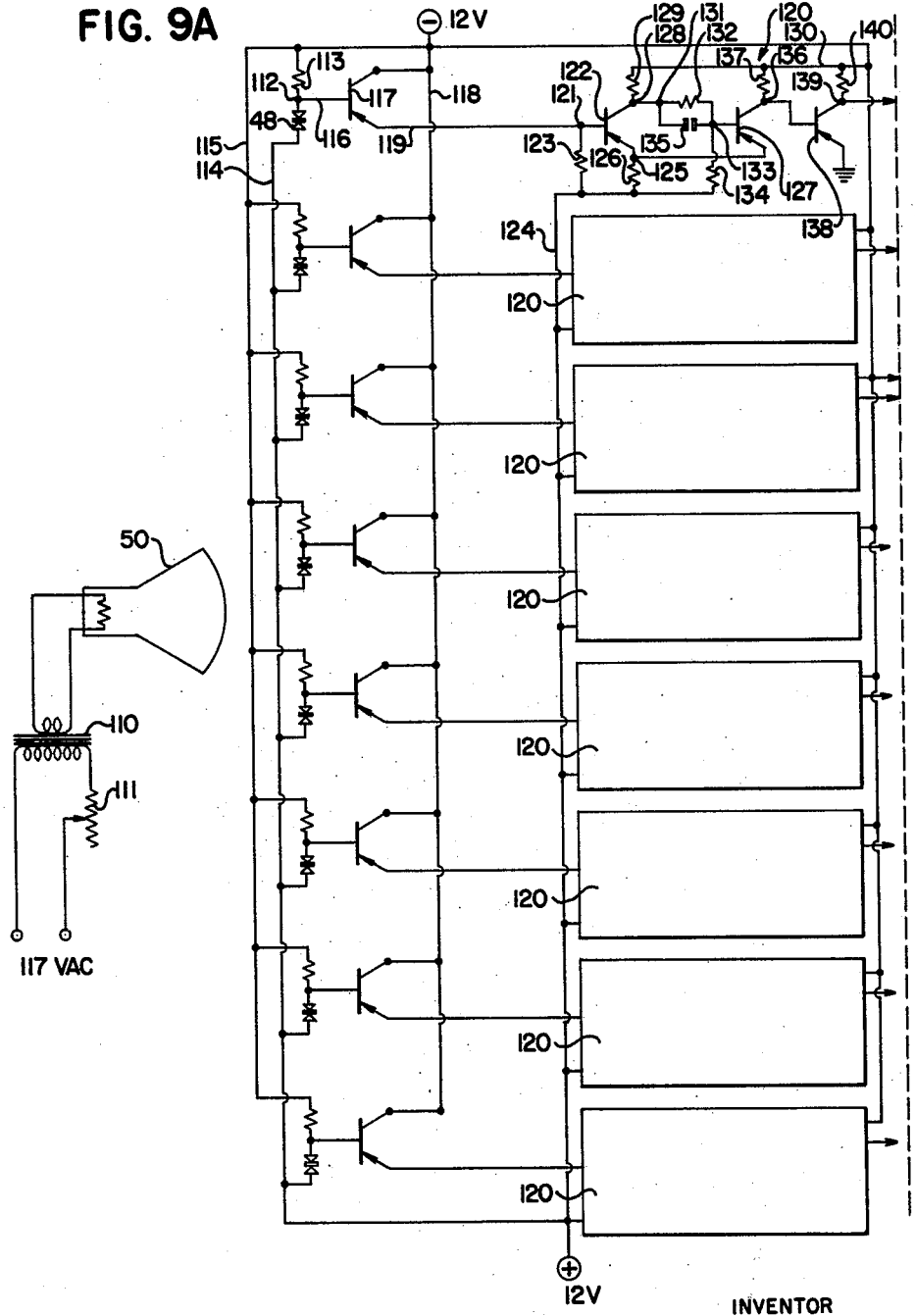

Nov. 24, 1964 C. B. TRIMBLE 3,158,305
RECORD MEDIA HANDLING APPARATUS
Filed March 14, 1960 7 Sheets-Sheet 6

INVENTOR
CEBERN B. TRIMBLE

BY
HIS ATTORNEYS

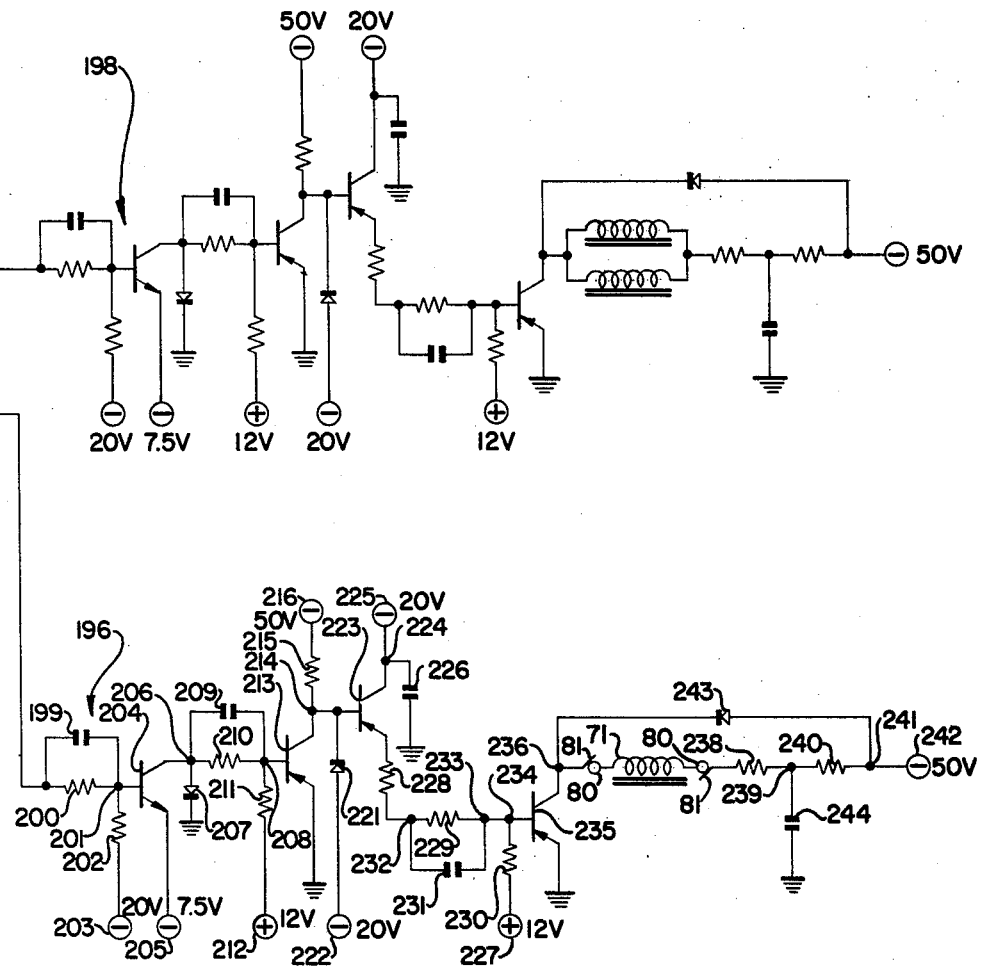

United States Patent Office 3,158,305
Patented Nov. 24, 1964

3,158,305
RECORD MEDIA HANDLING APPARATUS
Cebern B. Trimble, Dayton, Ohio, assignor to The National Cash Register Company, Dayton, Ohio, a corporation of Maryland
Filed Mar. 14, 1960, Ser. No. 14,888
14 Claims. (Cl. 226—34)

The present invention relates generally to high-speed record-media-handling apparatus, and more particularly to novel driving means for such apparatus.

The present invention is adapted to handle a number of different types of record media, but for illustrative purposes it will be described primarily as a perforated-tape-handling device. It will be recognized, however, that other types of record members, such as punched cards, could also be handled by the present invention.

Perforated paper tape is a very common type of medium for the storage and transmission of information used in modern data-processing and computing systems. Among its advantages for such use are low cost, ease of encoding the information on the tape, permanence, and ease of storage and transportation. The tape may be generated in a number of different ways, as, for example, by recorders in point-of-sale recording systems, or by card-to-tape converters for converting punched card information to tape information. The tapes thus generated may be transmitted to a central processing unit in which the data encoded on the tape is sensed by a tape-reading device and is converted into electrical signals for use by the central processing unit.

Due to the high operating speed of modern data-processing and computing devices, a tape-sensing device must also operate at a high speed for maximum efficiency. Since intermittent sensing, with a large number of starts and stops of the motion of the tape, is a characteristic of the manner in which information is read from the tape by the sensing means and utilized in the central processing unit, extremely rapid acceleration and deceleration of the tape become of paramount importance.

In order to achieve the desired rapid acceleration and deceleration of the tape, a number of problems must be resolved, among which are mechanical inertia of the operating parts, and possibility of tape breakage due to the high stresses imposed on the tape.

An important advance in overcoming the foregoing problems has been made by a previous invention of the present inventor, which is the subject of United States Patent No. 2,864,609, issued December 16, 1958. That invention employs a continuously-operating driving means, generally in the form of a capstan, with which the tape is yieldably engaged to be moved along a path through a reading station, and further employs a brake, which normally lightly engages the tape in a pre-loading manner, but which can be operated to grip the tape to arrest the motion thereof promptly, the drive yielding at this time. The present invention employs a similar braking means, and employs, in addition, a novel tape-driving means, capable of imparting extremely rapid acceleration to the tape. In addition, a novel cooperative relationship is provided between the braking means and the driving means, so that these elements interact in such a manner as to maximize the acceleration and deceleration of the tape, and to minimize the possibility of tape breakage.

The novel driving means includes a constantly rotating capstan provided with an electromagnetic coil, which may be selectively energized. Cooperating with the capstan is a rotating member of magnetic material, which is so positioned that a portion of its periphery is located in close proximity to the capstan, and which is driven by separate driving means, so that it rotates in a direction opposite to the direction of rotation of the capstan.

The tape is positioned between the adjacent surfaces of the capstan and the rotating member. When the electromagnetic coil forming a part of the capstan is not energized, the tape, if held against movement by the magnetic brake, will not be driven by the rotating member or the rotating capstan, the surfaces of which will merely slip on the surfaces of the tape. However, when the electromagnetic coil on the capstan is energized, flux is generated, which attracts the member toward the capstan and squeezes the tape between these two elements. With the force of the magnetic brake, which has held the tape against movement, released, the tight grip of the tape by the rotating capstan and the member is effective to cause rapid acceleration of the tape, up to the peripheral speed of the capstan and the member.

Conversely, when a stop signal is received by the tape-sensing means, the braking means is applied, while the electromagnetic coil on the driving capstan is simultaneously deenergized. Thus the braking means applies a large frictional force to the tape by squeezing it between the two operating surfaces of the brake, while, at the same time, the squeezing action applied to the tape by the capstan and the member is released, since the member is no longer attracted to the capstan by magnetic force.

In one form of driving means described herein, the member cooperating with the capstan for driving the tape is of annular configuration and is supported on a rotatable member, which is also effective to drive it.

A second form of driving means is also described, in which a driven roller cooperates with the capstan for driving the record members to be sensed. This form is well adapted for use where perforated cards, rather than tape, are to be sensed.

A tape-driving system is thus provided in which the driving means and the braking means are simultaneously controlled by electrical signals, and in which mechanical inertia of the moving parts is minimized, thereby providing extremely rapid acceleration and deceleration of the tape. Also, since the driving means and the braking means are operated simultaneously, stress on the tape is greatly lessened, and tape breakage is minimized.

It may be noted, purely for purposes of illustrative example, that a tape-handling device embodying the present invention has accelerated paper tape from a stopped position to a speed of 1,000 digits per second (100 inches per second) in a period of 1.5 to 2 milliseconds. Similiarly, the tape has been moved from a stopped position to a speed of 1,800 digits per second (180 inches per second) in a time of approximately 2 milliseconds. As has been stated, these performance figures are purely illustrative and should not be construed as limiting in any sense, since tape speeds and accelerations may be varied over a a wide range according to the apparatus and the tape employed.

Accordingly, it is an object of the present invention to provide record-media-handling apparatus capable of extremely rapid acceleration and deceleration of the tape.

Another object is to provide a high-speed record-media-handling apparatus in which damage to the record media is minimized.

A further object is to provide record-media-handling apparatus which includes a braking means and a driving means, both of which are controlled by the same electrical signal in cooperative relation.

Yet another object is to provide record-media-handling apparatus having first continuously-operating driving means normally engaging one side of the record media; second continuously-operating driving means normally engaging the other side of the record media; and control means forming a part of the first driving means effective to cause movement of the second driving means toward the first driving means to squeeze the record media between the two driving means, thereby frictionally imparting to the record media the combined driving force of the two driving means.

With these and incidental objects in view, the invention includes certain novel features of construction and combinations of parts, a preferred form or embodiment of which is hereinafter described with reference to the drawings which accompany and form a part of this specification.

In the drawings:

FIG. 2 is a partial sectional view showing the driving motor and the belt-and-pulley drive for transmitting motion to the various components of the driving means;

FIG. 3 is a plan view showing the high-speed brake, the tape-guiding means, the reading head, and the driving means;

FIG. 4 is a sectional view of the optical slot portion of the reading station, taken on line 4—4 of FIG. 5;

FIG. 5 is a sectional view of the optical slot portion of the reading station, taken on line 5—5 of FIG. 1;

FIG. 6 is a detail view, partially in section, of the driving capstan used in the driving means;

Figure 9B:
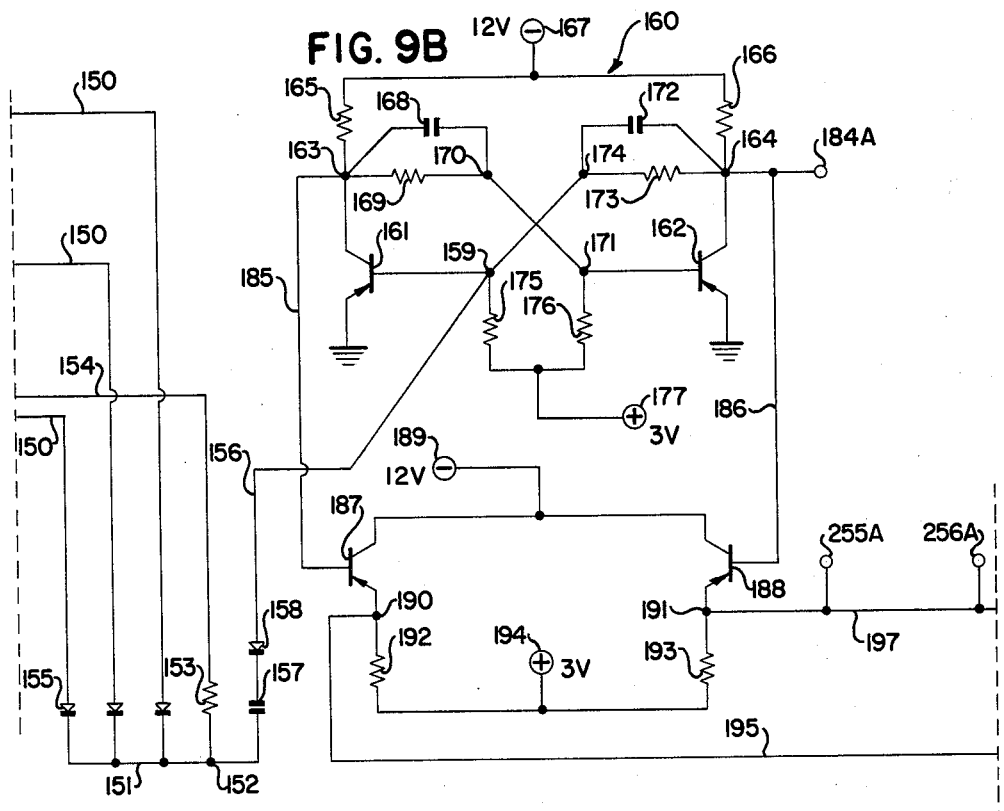
Figure 10:
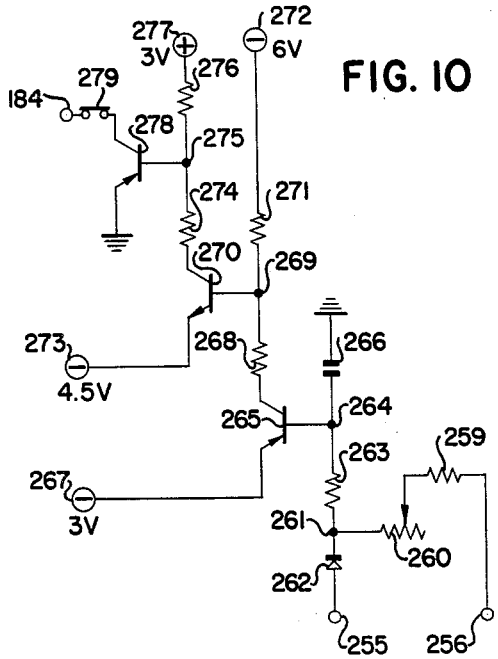

FIGS. 9A, 9B, and 9C, taken together, constitute a circuit diagram showing the control circuitry employed in the tape-handling apparatus of the present invention for controlling and coordinating the operation of the high-speed brake and driving means; and FIG. 10 is a circuit diagram of a "resume read" control circuit.

Figure 1:
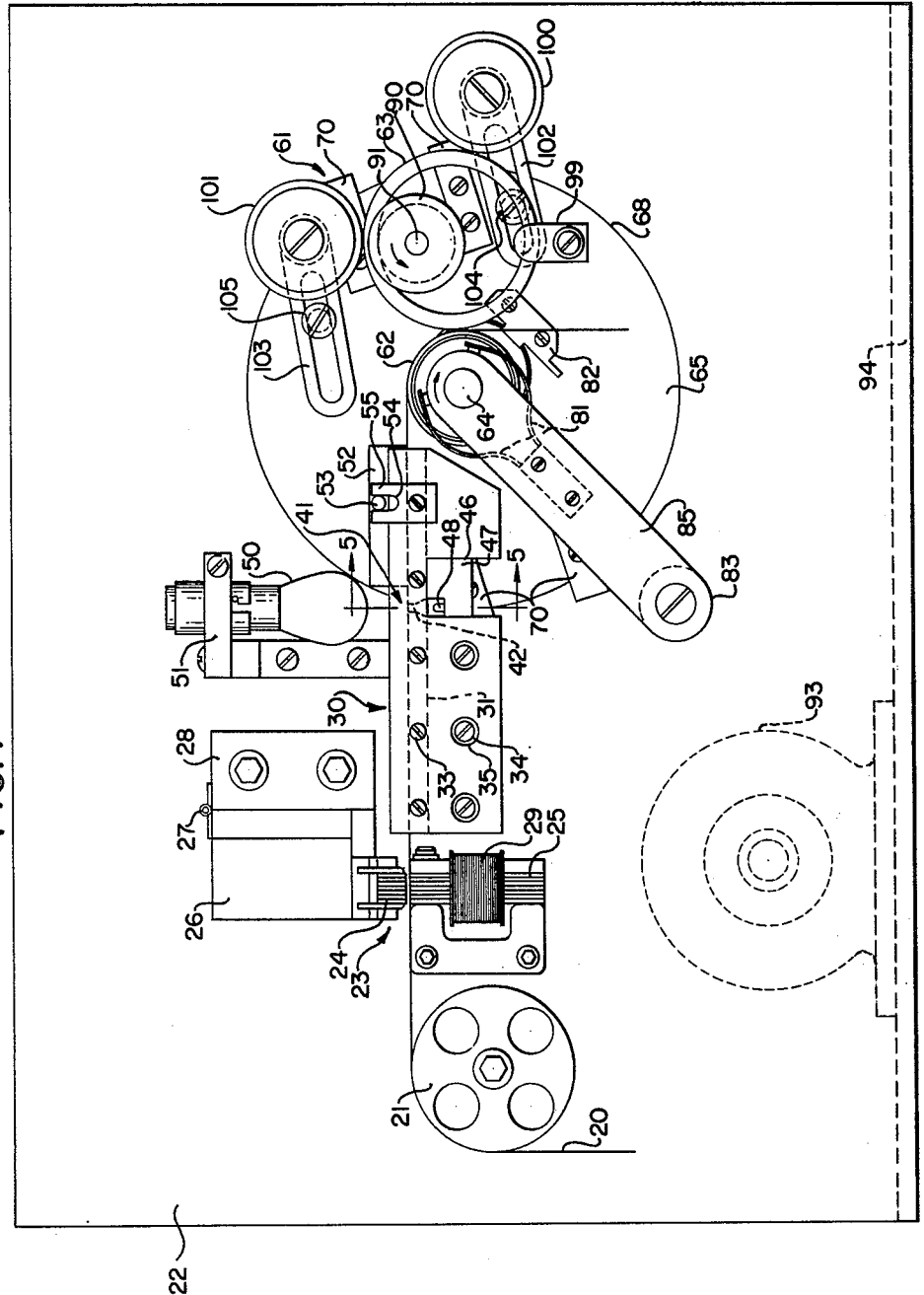
FIG. 1 is a partial side elevation of the novel tape-handling apparatus, showing particularly the tape-guiding means, the high-speed brake, the reading head, and the driving means.

There is shown, in FIG. 1, a record tape 20, passing over a guide 21, which serves to change the direction of movement of the tape, from vertical to horizontal. The guide 21 is mounted on a frame 22.

The means for supplying tape to the tape-handling apparatus of the present invention is not shown, but may comprise, if desired, a tape supply reel and a loop box, as disclosed in the previously-mentioned United States Patent No. 2,864,609.

To the right of the guide 21, as viewed in FIG. 1, is a high-speed brake 23, through which the tape passes, between an armature 24 and a lower portion 25, said lower portion being secured to the frame 22. The armature 24 is movably secured to a block 26, which in turn is pivoted by a hinge 27 to a second block 28, fixed to the frame 22. This arrangement permits the armature 24 to be pivoted out of the way when a new tape is to be inserted into the tape-handling apparatus. The armature 24 is movably mounted on the block 26 so as to exert a slight constant drag on the tape 20, even when said tape is moving. Halting of the tape 20 is accomplished by energizing coils 29 of the lower portion 25 of the brake 23. The armature 24 is attracted by the magnetic field produced by the energization of the coils 29, and, moving through an extremely small distance, is capable of gripping the tape 20 almost instantly and bringing it to a complete stop. For a complete description of the construction and operation of a high-speed brake of the type shown at 23 in FIG. 1, reference may be had to the previously-cited United States Patent No. 2,864,609.

To the right of the brake 23, a tape guide, shown generally at 30, is fixed to the frame 22. This guide comprises a table 31 and a pair of side-walls 32 (FIG. 3). The tape rides on the table 31 and is prevented from transverse movement by the side-walls 32. The side-walls 32 are secured to the table 31 by means of machine screws 33, and the entire assembly is secured to the frame 22 by means of machine screws 34, which connect the inner wall 32 to the frame 22 through spacers 36. Apertures 35 are provided in the outer side-wall 32 in order to provide ready access to the heads of the machine screws 34.

Intermediate the ends of the tape guide 30 is situated a reading station, shown generally at 41 (FIGS. 1, 3, 4, and 5). A slot 42 extends transversely of the table 31 and divides said table into two separate portions. The slot 42, as best shown in FIG. 4, is defined by short vertical wall portions 43 and longer tapering diverging wall portions 44, which provide a slot that is wider at its lower end than at its upper end. In order to increase the transverse width of the slot 42 at its base, the side-walls 32 are angularly cut away as shown in FIGS. 4 and 5 by reference character 45.

Below the slot 42, a rectangular cutout 46 is provided in each of the side-walls 32, in order to receive a block 47 of suitable insulating material, in which are located a plurality of photodiodes 48. The block 47 is secured to the under side of the table 31 by means of machine screws 49 or other suitable fastening means. As shown in FIG. 4, the photodiodes 48 are positioned in the block 47 in a vertical plane which extends through the slot 42, and, as may be seen in FIG. 5, the photodiodes 48 are arranged with their upper operative ends along an arc, the center of which is located at a light source 50, which is mounted by means of a bracket 51 on the frame 22. The longitudinal axes of the various photodiodes 48 extend radially outward from a center point at the light source 50. The photodiodes 48 are so spaced in their location in the block 47 that the radii which pass through the longitudinal axes of the various photodiodes also pass through centers of the various channels on the tape 20, so that when a perforation is present in any one of the channels of the tape, the light rays passing through it from the light source 50 will impinge directly upon the corresponding photodiode 48.

It will be seen that an extremely simple structure has been provided for the sensing station. The structure of FIGS. 4 and 5 is easy to manufacture and does not require any complex, expensive lens or mirror optical arrangements to accomplish the sensing function. Also, the open slot construction is well suited for removal of chaff and other foreign matter which may be carried by the tape into the sensing station. Since there is a relatively large volume in which such material may collect, and since the photodiodes 48 are spaced a considerable distance from the tape-guiding surface, an accumulation of foreign material is not likely to become lodged between the photodiodes and the tape-guiding surface to interfere with sensing of the tape.

Furthermore, due to the arrangement in which the photodiodes 48 are spaced a considerable distance from the tape-guiding surface, and due to the fact that each of these photodiodes has a relatively small radiation-sensing surface, the present sensing means is better adapted to discriminate between code perforations on the tape and paper faults (small translucent areas which sometimes are present on tape of this type) than are more conventional sensing systems. This is due to the fact that paper faults, which permit some radiation from the source 50 to pass through the tape, act to diffuse the radiation. On the other hand, radiation passing through a code perforation in the tape is not appreciably diffused. Since the photodiodes 48 are spaced a considerable distance from the tape, diffusion of radiation through a paper fault is effective to reduce greatly the amount of radiation impinging upon any one photodiode 48, in comparison with the direct radiation on such a diode resulting from a code perforation in the tape. As a result, discrimination by the photodiodes 48 between spurious signals and genuine signals is much more accurate than with more conventional sensing systems.

Immediately to the right of the reading station 41, as seen in FIG. 1, is a damping block 52, which is positioned on the table 31 between the side-walls 32, and which is retained in position by means of a stud 53 on said block, cooperating with a slot 54 on a bracket 55 mounted on the outer side-wall 32 of the tape guide 30. The block 52 is not essential to proper operation of the tape-handling apparatus, but it is desirable, inasmuch as it acts to damp out standing waves in the tape 20 which may be generated under certain circumstances by the intermittent starting and stopping motion imparted to said tape by the tape-handling mechanism.

Located to the right of the tape guide 30, as viewed in FIG. 1, is the tape drive means, indicated generally at 61, which includes a capstan 62 and an annular member 63, between which the tape extends and by means of which it is driven.

The capstan 62 is fixed to a shaft 64, which extends through a circular plate 65 and a bearing block 66 and has fastened adjacent its opposite end a pulley 67 (FIG. 3). The bearing block 66 is fixed to the plate 65, which in turn is mounted in a complementary cutout 68 in the frame 22. The plate 65 may be rotated with respect to the frame 22 for adjustment of certain elements of the driving means, as will be described subsequently, and is maintained in proper position by four guides 70, fastened to the plate 65 and extending past its periphery to overlap the frame 22. These guides may be tightened by their fastening means to grip the frame 22, in cooperation with the block 66, which extends beyond the plate 65 and overlaps the frame 22 on the opposite side. The plate 65 is thereby retained in its desired position with respect to the frame 22.

The construction of the capstan 62 is best shown in FIG. 6 and will now be described. Between the ends of the capstan, and arranged in annular position around the shaft 64, is the winding 71 of an electromagnetic coil. The winding 71 is supported on a bobbin 72, formed from nylon or other insulating material, which in turn is supported at either end by a core member 73, of magnetic material. A spacer 74, also formed from magnetic material, is positioned between the two core members 73. The elements 73 and 74 are provided with a bore of a size to accommodate the shaft 64, and the core members 73 are pinned to said shaft by means of pins 75. A pair of magnetic pole pieces 84 are positioned over the winding 71. The winding and associated elements are potted with a suitable material, such as an epoxy resin, which also fills the gap 76 between the two pole pieces 84.

To the outside of the two core members 73 are located a pair of nylon slip ring holders 77, which are secured to the members 73 by suitable fastening means, and which are provided with screw threads at their outer ends to receive nylon nuts 78. Positioned between the slip ring holder 77 and the nut 78 at each end of the capstan 62 are an annular slip ring lug 79 and a plurality of slip rings 80, of suitable conducting material. The lugs 79 are connected to wires extending from either end of the winding 71 and are maintained in close contact with the slip rings 80 by means of the nuts 78, which may be tightened on the holders 77 sufficiently to insure adequate engagement of the elements 79 and 80.

The slip rings 80 on the capstan 62 cooperate with collectors 81 (FIGS. 1 and 3) for the transmission of electrical power to the rotating capstan. One set of collectors 81 nearest the plate 65 is mounted on said plate by a bracket 82, while the other set of collectors 81 is mounted on a bracket 85, which is secured to the frame 22 by means of a spacer 83. At its upper end, the bracket 85 engages the shaft 64, in order to retain the collectors 81 in proper position with respect to the slip rings 80. The sets of collectors 81 are insulated from the frame 22 and the bracket 85 by means of insulators 86.

The annular member 63 cooperates with the capstan 62 in driving the tape, and rides freely upon a drive wheel 90, which is secured to a shaft 91, which extends through the circular plate 65, is journaled in the block 66, and has fixed at its other end a pulley 92.

Both of the pulleys 67 and 92, as best shown in FIG. 2, are driven from a motor 93, mounted on a base 94. The pulleys 67 and 92 are connected by means of a belt 95 to a pulley 96 on the operating shaft of the motor 93. An additional pulley 97, mounted on a shaft 98, which is journaled in the block 66, takes up slack in the belt 95 and causes the belt to engage the pulleys 67 and 92 along a longer arc, to reduce slippage of said belt on these pulleys.

As most clearly shown in FIG. 1, the drive wheel 90 is so positioned that the annular member 63, which is supported by said drive wheel, is normally urged by the force of gravity in such a manner that its outer cylindrical surface engages the tape 20 at a location opposite that where the outer cylindrical surface of the capstan 62 engages said tape.

Several guiding and retaining means are provided to maintain the annular member 63 in its proper relationship to the capstan 62. A bracket 99, fixed to the circular plate 65, retains the annular member 63 against movements transverse of the longitudinal axis of the shaft 91. Also, guide rollers 100 and 101 prevent excessive vibration or swing of the member 63 as it is rotated by the drive wheel 90, and as it may be displaced by irregularities, such as splices, in the tape. The guide rollers 100 and 101 are provided with peripheral bands of resilient material for contact with the annular member 63, and are rotatably mounted on slotted supports 102 and 103, respectively. These supports in turn are fixed to the circular plate 65 by means of bolts or other suitable fastening means 104 and 105, which may be loosened to permit the repositioning of the supports 102 and 103 for adjustment of the relation of the rollers 100 and 101 to the annular member 63.

It will be seen that, by means of the adjustability of the circular plate 65 in the frame 22, and by virtue of the additional adjustability of the rollers 100 and 101 with respect to the plate 65, the position of the annular member 63 with respect to the capstan 62 may be selectively altered until the most advantageous location is discovered. This enables a considerable degree of flexibility to be obtained in achieving optimum conditions for a most efficient, rapid tape drive.

Under normal circumstances, the force of gravity alone is sufficient to maintain the annular member 63 in proper position with respect to the tape 20; and the bracket 99 and the guide rollers 100 and 101 are not essential to the proper operation of the tape-driving means. These elements do aid in maintaining the proper relationship of the annular member 63 with respect to the tape 20, however, and accordingly improve the operation of the driving means.

The manner in which the capstan 62 and the annular member 63 cooperate to drive the tape 20 will now be described. When the winding 71 of the capstan 62 is not energized, the brake 23 is energized, by means of a control circuit which will be subsequently described, and the tape 20 is not driven. Although the constantly rotating capstan 62 and the constantly rotating annular member 63 are in contact with opposite sides of the tape 20, and are thus operatively coupled to apply a predetermined urging force to said tape because of the force of gravity on the annular member 63, they are not effective to drive the tape 20, since the frictional force applied to the tape 20 by these members is not large, and their surfaces merely slip on the tape. However, when the winding 71 of the capstan 62 is energized, and the brake 23 is simultaneously deenergized, by means of the control circuit which will be described subsequently, the annular member 63 is magnetically attracted to the capstan 62, pivoting about its point of contact with the drive wheel 90, thus increasing many-fold the force applied to opposite surfaces of the tape by the rotating capstan 62 and the rotating annular member 63. With the retaining force of the brake 23 released, the cooperating capstan 62 and annular member 63 are thus effective to cause a very rapid acceleration of the tape 20, up to the peripheral speed of the capstan 62 and the annular member 63.

Alternate Embodiment

Figure 7:
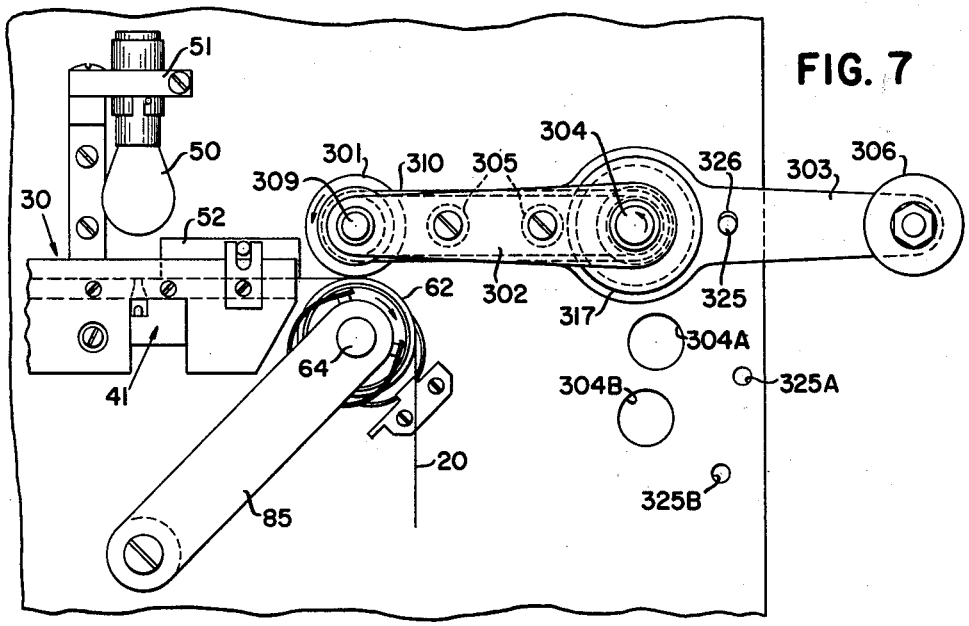
FIGS. 7 and 8 are elevation and plan views of an alternate embodiment of the driving means.
Figure 8:
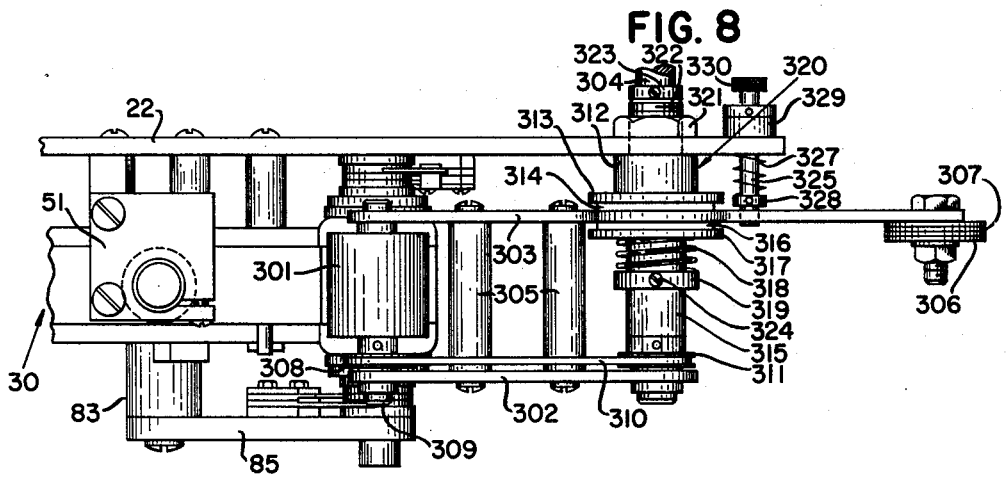

Shown in FIGS. 7 and 8 is an alternate embodiment of the driving means which may be used in place of the annular member 63 and associated structure shown in FIGS. 1 to 6 inclusive. In FIGS. 7 and 8, elements which are the same as those shown in the previously-described embodiment have the same reference characters, while those elements which differ from the corresponding elements in the embodiment of FIGS. 1 to 6 inclusive have different reference characters applied thereto.

The tape guide 30, the reading station 41, the capstan 62, and associated structure shown in FIGS. 7 and 8 are identical to the corresponding elements shown in FIGS. 1 to 6 inclusive. Cooperating with the capstan 62 in the embodiment of FIGS. 7 and 8 is a roller 301, formed of a magnetic material and fixed on a shaft 309, which is mounted near the ends of two beam members 302 and 303, which in turn are pivoted on a shaft 304, journaled in the frame 22. The beam members 302 and 303 are fixed in position with respect to each other by means of a pair of spacers 305, to which the beam members are secured.

The beam member 303 extends to the right of the shaft 304, as shown in FIG. 7, and has mounted at its other end a counter-balancing weight 306, comprising a number of disks 307, secured to the beam member 303 by any appropriate securing means. The number of disks 307 applied to the beam member 303 may be changed in order to adjust the balance of said beam member and the force with which the roller 301 is urged by gravity or other suitable means into engagement with the tape 20 opposite the capstan 62.

Means are provided to drive the roller 301 in the direction indicated by the arrow in FIG. 7, and include a pulley 308, fixed to the shaft 309, on which the roller 301 is also fixed, a belt 310, and a pulley 311, fixed on the shaft 304, which in turn is driven through a pulley (not shown) by a motor, such as the motor 93 in FIG. 2.

The supporting frame for the roller 301, including the beam members 302 and 303 and the spacers 305, is spaced from the frame 22 by means of a spacing portion 312 of a support member 320, extending through the frame 22 and fixed with respect thereto by means of a nut 321 engaging a reduced threaded portion 322 of the member 320 on the other side of the frame 22 to clamp said frame between said nut and the portion 312. A circular bore is provided in the member 320 for supporting the shaft 304. A collar 323, fied to the shaft 304, prevents undesired movement of said shaft. A circular pad 314, of felt or some other suitable material, is positioned on the shaft 304 between a flange member 313, fixed to the support member 320, and the beam member 303. On the opposite side of the beam member 303, a spacer 315 is mounted free on the shaft 304. A pad 316, similar to the pad 314, is mounted on this spacer between the beam member 303 and a flange member 317, which is identical in configuration to the flange member 313. A spring 318, positioned circumferentially of the spacer 315 between the flange member 317 and a collar 319, adjustably secured to the spacer 315 by means of a set screw 324, urges the flange member 317 upward, as viewed in FIG. 8, to compress the pads 314 and 316 against the sides of the beam member 303 to provide a damping effect for any swinging movement of the beam member 303.

An additional means to limit movement of the beam member 303 is provided in the form of a retaining rod 325, one end of which is adapted to fit within a slot 326 in the beam member 302. The slot 326 is of sufficient length to permit normal movement of the beam member 303 incident to driving of the tape 20, but is effective to prevent excessive movement of said beam member. The rod 325 is mounted in a circular opening in the frame 22 and is normally urged into the slot 326 by a spring 327, which is mounted on the rod 325 and extends between the frame 22 and a collar 328, secured on said rod. A second collar 329 is fixed on the rod 325 on the opposite side of the frame 22, and a knurled knob 330 is fixed to the end of said rod. It will be seen that the spring 327 is normally effective to maintain the rod 325 in the slot 326 of the beam member 303, but that said rod may be withdrawn from the slot by grasping the knob 330 and pulling upwardly, as shown in FIG. 8. The rod 325 is thus effective normally to limit the movement of the beam member 303 about its shaft 304, but may be withdrawn from engagement with said beam member to permit the beam member to be swung through a large arc of movement when desired, as, for example, when tape is being loaded into the tape-handling device.

The position of the roller 301 with respect to the capstan 62 may be adjusted, if desired, by positioning the shaft 304 through any one of a series of bearing holes such as 304A and 304B in the frame 22. Corresponding holes 325A and 325B are provided to receive the retaining rod 325. The most effective position for the roller 301 with respect to the capstan 62 may thus be determined and utilized.

The mode of operation of this embodiment of the driving means is similar to that of the first form. When the winding 71 of the capstan 62 is not energized, the brake 23 is energized, by means of the control circuit which will be described subsequently, and the tape is not driven. The engagement of the constantly-rotating capstan 62 and the constantly-rotating roller 301 with opposite sides of the tape 20 does not drive said tape, since the frictional force applied is not sufficient, and these elements merely slip on the surfaces of the tape. However, when the winding 71 of the capstan 62 is energized, and the brake 23 is simultaneously deenergized, by means of the control circuit referred to above, the roller 301 is magnetically attracted to the capstan 62, said roller and the beam members 302 and 303, on which it is supported, pivoting on the shaft 304, thus greatly increasing the force applied to opposite surfaces of the tape 20 by the capstan 62 and the roller 301, both of which, it will be recalled, are constantly rotating. A very rapid acceleration of the tape 20 up to the peripheral speed of the capstan 62 and the roller 301 is thus caused to take place.

Operating Circuitry

The circuitry for converting the information on the tape into electrical signals, and for controlling the operation of the tape-handling device, is shown in FIGS. 9A, 9B, and 9C.

As shown in FIG. 9A, the source 50 of illumination for the photodiodes 48 may consist of a lamp of type No. 1130 manufactured by General Electric Company, to which power is supplied from the 6-volt secondary of a transformer 110. The primary of the transformer 110 may be connected in series with a 175-ohm potentiometer 111 to a 117-volt A.C. source of potential. The power supply to the lamp, and therefore the illumination produced by said lamp, may be varied as desired by adjustment of the potentiometer 111.

As previously described, the light from the source 50 is permitted by holes in the tape 20 to fall upon photodiodes 48, which may be of type 1N2175, manufactured by Texas Instruments, Inc., according to the particular channels of the tape which are perforated. Each photodiode is serially connected to a point 112 and a 100,000-ohm resistor 113 in a path extending between a conductor 114, connected to a +12-volt D.C. source of potential, and a conductor 115, connected to a −12-volt D.C. source of potential. The photodiodes 48 relating to the various channels are thus connected in parallel relationship to each other between the conductors 114 and 115. A conductor 116 extends from each point 112 to the base of a transistor 117, which may be of PNP type 2N113. The collector of each transistor is connected to a conductor 118, which is connected in turn to a −12-volt source of potential, while the emitter of each transistor 117 is connected over a conductor 119 to a pulse-shaping and -retiming circuit shown generally at 120. Since the circuits 120 for all of the channels are identical, only one such circuit is shown in detail in FIGS. 9A and 9B, while the remainder are represented in block form.

The conductor 119 is connected over a point 121 to the base of a transistor 122, which may be of the PNP type 2N113. The point 121 is connected over a 20,000-ohm resistor 123 and a conductor 124 to a +12-volt D.C. source of potential. The emitter of the transistor 122 is connected over a point 125 and a 3,300-ohm resistor 126 to the conductor 124, and is also connected at the point 125 to the emitter of a transistor 127, which may also be of PNP type 2N113.

The collector of the transistor 122 is connected over a point 128 and a 10,000-ohm resistor 129 to a conductor 130, which in turn is connected to a −12-volt D.C. source of potential. The resistor 129 forms part of a voltage-dividing network which also includes, in series, a point 131, a 47,000-ohm resistor 132, a point 133, and a 150,000-ohm resistor 134, and which extends to the +12-volt conductor 124. A 100-micromicrofarad capacitor 135 is connected in parallel with the resistor 132 at points 131 and 133.

The base of the transistor 127 is coupled to the above-described voltage-dividing network at point 133, and the collector of said transistor is connected over a point 136 and a 4,700-ohm resistor 137 to the −12-volt conductor 130. From the point 136, the collector of the transistor 127 is also connected to the base of a transistor 138, which may be of the PNP type 2N113, whose emitter is connected to a base reference potential, shown here as ground, and whose collector is connected over a point 139 and a 680-ohm resistor 140 to the −12-volt conductor 130.

The outputs from the pulse-shaping circuits 120 are taken from the point 139 on the collector circuit of the transistor 138 in each circuit 120 and may be used in desired combinations to control the operations of the tape-handling device, as input into a central processing unit, or for other suitable purposes. As shown in FIG. 9B, the outputs from the upper three channels are combined here in an "And" gate to control the starting and stopping of the tape-handling device. The above, of course, is merely an illustrative use of the outputs from these three channels. The outputs from the five lower channels may serve as input to a computer or other utilizing device, or may be translated to decimal or other desired form.

The mode of operation of the pulse-shaping circuit 120 in transforming a signal generated by illumination of a photodiode 48 into a wave form of the desired configuration will now be described.

With the circuit parameters given in the above description, point 112 in the circuit diagram of FIG. 9A is at a potential level of −6 volts when the photodiode 48 is not illuminated. When the photodiode 48 is momentarily illuminated by passage of a perforation in the tape across the reading station, the potential level at point 112 changes from −6 volts to +11 volts. This signal is applied to the base of the transistor 117, which functions as an emitter follower, the signal being effective to cause the emitter of the transistor 117 to go from a potential of −6 volts to a potential of +11 volts. The function of the transistor 117 is to act as an impedance matching device, matching the impedance of the photodiode circuit to the impedance of the pulse-shaping circuit 120.

The signal from the emitter of the transistor 117 is applied over the conductor 119 to the base of the transistor 122 in the pulse-shaping circuit 120. The transistor 122 is overdriven and is effective to amplify and invert the signal which is applied to its base over the conductor 119.

With the photodiode 48 in a dark condition, and the potential at the base of the transistor 122 at −6 volts, this transistor, which is of the PNP type, will conduct, and its emitter will follow at a potential of approximately −6 volts. At this time, its collector is at a potential of approximately −6.25 volts. When the photodiode 48 is illuminated, and the signal on the conductor 119 applied to the base of the transistor 122 is consequently changed to +11 volts, the transistor 122 is rendered non-conducting. Due to the emitter resistor 126, the potential of the emitter of the transistor 122 commences to rise at this time and to follow the driving signal applied to the base.

The transistor 127, whose emitter is coupled to the emitter of the transistor 122, is in a conducting condition, when the transistor 122 is non-conducting, and is non-conducting when the transistor 122 is conducting. When the transistor 122 is rendered non-conducting, its collector moves in potential toward the −12 volts of potential on the conductor 130, to which it is connected. The base of the transistor 127, which is coupled over the resistor 132 and the capacitor 135 to the collector of the transistor 122, changes correspondingly in potential. Similarly, at this time, the emitters of the transistors 122 and 127 change in potential from −6 volts toward +12 volts. At a given time, the emitter of the transistor 127 is rendered conducting. With conduction of this transistor, the base and the emitter stabilize at potentials of approximately +1 volt.

As a consequence of the interrelation of the transistors 122 and 127, the output taken from point 136 in the collector circuit of the transistor 127 has a square wave configuration, rather than the irregular form appearing at point 112. In addition, the circuit including the two transistors 122 and 127 has a hysteresis or back-lash effect such that the wave form will remain square even though there are irregularities in the signal produced at point 112, as, for example, the signal dropping to a lower level during the pulse, or when, in reading of a stop signal, the hole in the tape 20 is somewhat overshot before the tape is halted.

The signal from the point 136 is inverted and amplified by the transistor 138 in a conventional manner, and the output from the collector circuit of this transistor, taken at point 139, is of suitable wave form and amplitude to be used in the manner described previously.

The output conductors 150 from points 139 in the circuits 120 of the three upper channels of FIG. 9A are connected over diodes 155 to a conductor 151, which in turn is connected over a point 152, a 10,000-ohm resistor 153, and a conductor 154 to a −12-volt source of potential.

It will be seen that, so long as all of the transistors 138 in the circuit 120 for the upper three channels are non-conducting, no path to ground over the point 152 and the resistor 153 is completed, and the potential at the point 152 remains at −12 volts. However, at the time that any one or more of the transistors 138 of the circuits 120 of the three upper channels is rendered conducting, a path is completed to ground through said transistor, and the potential at point 152 accordingly shifts to a level near ground potential.

Since the transistors 138 are non-conducting, when their corresponding photodiodes 48 are illuminated, it will be seen that the potential of point 152 will be at −12 volts whenever holes are sensed simultaneously in the upper three channels, indicating a stop signal. At all other times, the potential at point 152 remains at approximately ground level.

The signal at point 152 is transmitted on a conductor 156 over a 0.01-microfarad coupling capacitor 157 and an isolating diode 158, which may be of type 1N128. The conductor 156 is connected to a point 159 in a bistable operating circuit, shown generally at 160 in FIG. 9B. This circuit includes two cross-coupled transistors 161 and 162, which may be of PNP type 2N113. The emitters of these transistors are connected to a base reference potential, shown here as ground, while the collectors are connected over points 163 and 164, and over 470-ohm resistors 165 and 166, to a −12-volt source of potential applied at a terminal 167. The point 163 is connected over a parallel combination of a 1,000-micromicrofarad capacitor 168 and a 6,800-ohm resistor 169 to a point 170, which is in turn connected to a point 171 in the base circuit of the transistor 162. Similarly, the point 164 is connected over a parallel combination of a 1,000-micromicrofarad capacitor 172 and a 6,800-ohm resistor 173 to a point 174, which in turn is connected to the point 159 in the base circuit of the transistor 161. The points 159 and 171 are connected over 20,000-ohm resistors 175 and 176 to a +3-volt source of potential applied at a terminal 177.

The parameters of the bistable circuit 160 are such that, when one of the transistors 161 or 162 is conducting, the other is non-conducting, and vice versa. For purposes of illustration, let it be assumed that the tape is being fed by the driving means, and that no stop signal has been received, in which case the transistor 161 is non-conducting. The point 163 in the collector circuit of the transistor 161 is strongly negative, while the point 171 in the base circuit of the transistor 162 is also negative, causing the transistor 162 to conduct.

When a stop signal is sensed from the tape, a −12-volt pulse is applied through the capacitor 157 and the diode 158, and over the conductor 156 to the point 159 in the base circuit of the transistor 161, causing said transistor to begin conducting. As a result, the potential at point 163 in the collector circuit of the transistor 161 becomes less negative, which is reflected in a change to positive potential at point 171 in the base circuit of the transistor 162, causing said latter transistor to stop conducting. This, in turn, causes the potential at point 164 in the collector circuit of the transistor 162 to go strongly negative, which is effective to maintain a negative potential at point 159 in the base circuit of the transistor 161, so that said transistor continues conducting after the activating pulse which was applied to the bistable circuit 160 over the conductor 156 has been terminated.

Once the bistable circuit 160 (FIG. 17B) has been triggered so that the transistor 161 is rendered conducting and the transistor 162 is rendered non-conducting, it must be re-triggered back to its original condition, in which the transistor 161 is not conducting and the transistor 162 is conducting, before feeding of the tape can resume. The signal for accomplishing this re-triggering action is applied at the point 164 in the circuit 160 and either may come from a computer, as a consequence of a "resume read" order originating in said computer, or may come from a specially-designed "resume read" order circuit, which is designed to cause resumption of feeding of the tape after a predetermined time following the initiation of a stop order. Such a circuit might be used for testing purposes, or may be used in an operating system where it is desired, for some reason, to provide for initiation of tape feeding at a predetermined time interval after a stop signal has been received. Such a "resume read" circuit will be subsequently described in this application.

With the transistor 162 in non-conducting condition, potential at the point 164 is approximately −10 volts. A "resume read" signal, which may be applied to the point 164 from a terminal 184A, changes the potential level at the point 164 to approximately zero volts. This potential change is transmitted through the capacitor 172 and the point 174 to the point 159 in the base circuit of the transistor 161. Such a potential change on the base of the transistor 161 is effective to cause it to stop conducting, thereby causing the potential at point 163 in its collector circuit to become strongly negative. This negative-going signal is applied over the capacitor 168 and the point 170 to the point 171 in the base circuit of the transistor 162, and causes said transistor to commence conducting once more. This, in turn, lowers the potential at the point 164 in the collector circuit of the transistor 162, and thereby is effective to maintain the potential at point 159 on the base circuit of the transistor 161, to which the collector circuit of the transistor 162 is coupled, at near zero potential, to maintain the transistor 161 in non-conducting condition.

It will accordingly be seen that application of a stop signal over the conductor 156 to the bistable circuit 160 is effective to cause momentary halting of the feeding of the tape, which is followed after a short interval by re-triggering of the circuit 160 into its original condition, to permit resumption of reading of the tape, under the influence of a "resume read" signal applied to the terminal 184 associated with the circuit 160.

Two conductors 185 and 186 connect the points 163 and 164 of the bistable circuit 160 to the bases of two transistor 187 and 188, which may be of PNP type 2N113. These transistors serve to isolate the bistable circuit 160 from the brake and drive operating circuits, while at the same time transmitting the signals received from the bistable circuit 160 to the brake-operating and drive-operating circuits.

The collectors of the transistors 187 and 188 are connected to a terminal 189, to which a −12-volt source of potential is applied. The emitters of the transistors are connected over points 190 and 191, and 1,000-ohm resistors 192 and 193, to a terminal 194, to which a +3-volt source of potential is applied.

The point in the emitter circuit of the transistor 187 is connected over a 5,100-ohm resistor 202 to a tercircuit, shown generally at 196, while the point 191 in the emitter circuit of the transistor 188 is connected over a conductor 197 to a brake-operating circuit, shown generally at 198. Since the drive-operating circuit 196 and the brake-operating circuit 198 are practically identical, only the drive-operating circuit 196 will be described.

The two transistors 187 and 188, being connected as emitter followers, merely transmit the signal received from conductors 185 and 186 to the conductors 195 and 197, while acting to isolate the drive and brake circuits from the bistable circuit 160.

The conductor 195 is connected over a parallel combination of a 330-micromicrofarad capacitor 199, and a 1,200-ohm resistor 200, to a point 201, which in turn is connected over a 5,100-ohm resistor 202 to a terminal 203, to which is applied a −20-volt source of potential. The point 201 is also connected to the base of a transistor 204, which may be of NPN type 2N388.

The emitter of the transistor 204 is connected to a terminal 205, to which is applied a −7.5-volt source of potential. The collector of the transistor 204 is connected to a point 206. From the point 206, one path extends over a type 1DS1 diode 207 to a base reference potential, shown here as ground. The point 206 is also connected to a point 208 over a parallel combination of a 0.01-microfarad capacitor 209 and a 150-ohm resistor 210.

A first path from the point 208 extends over a 1,200-ohm resistor 211 to a terminal 212, to which a +12-volt source of potential is applied. The point 208 is also in the base circuit of a transistor 213 of PNP type 2N380. A connection to base reference potential, or ground, is provided for the emitter of the transistor 213, while a point 214 in its collector circuit is connected over a 150-ohm resistor 215 to a terminal 216, to which a −50-volt source of potential is applied.

The point 214 is connected over a diode 221, of type M500, to a terminal 222, to which is applied a −20-volt source of potential, and is also connected to the base circuit of a transistor 223, of PNP type 2N380. The collector circuit of the transistor 223 is connected over a point 224 to a termnial 225, to which is applied a —20-volt source of potential. A 100-microfarad capacitor 226 provides a connection between the point 224 and the base reference potential, shown here as ground.

The emitter of the transistor 223 is connected to a terminal 227, to which is applied a +12-volt source of potential over a voltage-dividing network which includes a 10-ohm resistor 228, a 10-ohm resistor 229, and a 100-ohm resistor 230. A capacitor 231 is connected in parallel combination with the resistor 229 between points 232 and 233.

The previously-mentioned voltage-dividing network is connected at point 234 to the base of a transistor 235, of PNP type 2N174. The emitter of the transistor 235 is connected to a base reference potential, shown here as ground, while the collector of said transistor is connected at point 236 to the operating circuit for the winding 71 of the clutch magnet of the tape-driving means.

The clutch magnet operating circuit extends serially from the point 236 over one set of slip rings 80 and collectors 81, the winding 71, the other set of slip rings 80 and collectors 81, a 3-ohm resistor 238, a point 239, a 25-ohm resistor 240, and a point 241 to a terminal 242, to which is applied a —50-volt source of potential. A diode 243, of type 20LF, is connected in parallel relation to the previously-described clutch magnet operating circuit between points 236 and 241. In addition, a 60-microfarad capacitor 244 is connected between the point 239 and a base reference potential, shown here as ground.

In order to describe the manner in which the clutch magnet operating circuit 196 functions, it will be assumed that, subsequent to the sensing of a stop signal, and the consequent switching of the bistable circuit 160, a "resume read" signal has just been applied over the terminal 184 to the bistable circuit 160, to cause it to switch back to its initial condition. As a consequence of this, the collector of the transistor 161 has gone from zero to —10 volts, and the point 190 in the emitter circuit of the emitter follower 187 has followed this voltage excursion from zero to —10 volts. This negative excursion is transmitted over the conductor 195, and the capacitor 199, in parallel combination with the resistor 200, to the base of the transistor 204 to cause said transistor to be rendered non-conducting. The capacitor 199 is effective to cause the full signal to appear immediately at the base of the transistor 204.

The application of the negative pulse to the base of the transistor 204 carries the potential of the base to approximately a —11-volt level. Since the emitter of the transistor 204 is at —7.5 volts, the transistor is accordingly rendered non-conducting, and therefore no current flows in its collector circuit. However, the diode 207 clamps the point 206 at ground potential.

When the transistor 204 is conducting, the point 206 of its collector circuit is at a potential of approximately —7.3 volts. Cutting off the transistor 204 causes the potential of the point 206 to shift to a level of approximately zero volts. This is reflected at point 208, on the base circuit of the transistor 213, in a change in potential from —0.4 volt to +1.7 volts, which is sufficient to cut off the transistor 213, which was previously in a conducting state, since the emitter of the transistor 213 is grounded.

Since current flow in the collector circuit of the transistor 213 is thus terminated, the potential of point 214 moves toward —50 volts, but is clamped at approximately —20 volts by the diode 221, connected to the terminal 222, to which a —20-volt source of D.C. potential is applied.

The base of the transistor 223 is thus maintained at a potential of about —20 volts, which causes the emitter of said transistor to assume the same level, since the transistor is connected as an emitter follower.

The transistor 235 is in a non-conducting condition as a result of the sensing of the stop signal, with its base potential at approximately +1.7 volts. When the emitter of the transistor 223 shifts to —20 volts, the negative-going signal is applied by way of resistors 228 and 229, and over the capacitor 231, to the base of the transistor 235, to cause it to shift to a potential level of about —0.4 volt, which is sufficient to cause the transistor 235 to begin conducting.

As the transistor 235 commences conducting, its collector potential shifts from —50 volts toward zero volts, but, since there is a large amount of inductance in the collector circuit, due to the winding 71, the shift is somewhat slowed and finally reaches a potential of approximately —0.2 volt. As the potential of the collector circuit moves toward zero, current builds up exponentially in the clutch operating circuit.

Prior to the commencement of conduction in the transistor 235, the capacitor 244 is fully charged to —50 volts. As conduction commences in the transistor 235, the capacitor 244 discharges, giving an initially heavy current surge to the transistor 235 through the winding 71 to overcome the inductance of said winding, and to effect rapid energization of said winding. Subsequently, as the capacitor 244 discharges, the potential at point 239 becomes approximately —5.5 volts, and the current through the winding 71 is correspondingly reduced.

Subsequently, when a stop signal is next sensed by the photodiodes 48 and is effective to change the state of the bistable circuit 160 in the manner previously described, the potential at point 190 of the emitter circuit of the emitter follower 187 shifts from —10 volts to zero, and the potential at the base of the transistor 204 is accordingly caused to shift from —11 volts to —6 volts. Since the emitter of the transistor 204 is at a potential of —7.5 volts, the transistor 204 is rendered conducting, and its collector potential goes from zero to —6.8 volts, the potential at point 206 having previously been clamped at zero volts by the diode 207 connected to ground, but said potential now shifting due to conduction in the transistor 204. Since the base of the transistor 213 is coupled to the collector of the transistor 204, the base potential on the transistor 213 shifts from +1.7 volts to —0.4 volt, causing said transistor to commence conducting.

As the transistor 213 begins conducting, the potential at point 214 of its collector circuit goes from —20 volts to approximately zero volts, and, since the base of the transistor 223 is coupled to the collector of the transistor 213, its emitter follows the potential on the base and accordingly shifts from —20 volts to zero volts.

The potential on the emitter of the transistor 223 is effective to cause the potential on the base of the transistor 235, to which it is coupled, to shift from —0.4 volt to +1.7 volts, which is effective to turn off the transistor 235.

The ensuing negative excursion of the signal on the point 236 of the collector circuit of the transistor 235 toward —50 volts is effective to deenergize the clutch winding 71.

Due to the magnetic field which has been built up in the winding 71, the cutting off of the transistor 235 causes an induced voltage of self-induction to be generated in the winding 71, which in turn causes the potential on the collector of the transistor 235 to rise rapidly. The diode 243 is provided to protect the transistor 235 from damage due to being "over voltaged," by limiting the negative potential excursion on the collector circuit of the transistor 235 to approximately —50 volts.

It will be seen that the circuit 198 functions in a manner similar to that described for the circuit 196, but operates at exactly opposite times. In other words, the signal at point 191 associated with the circuit 198 will in all cases be the inverse of the signal at point 190 associated with the circuit 196. Accordingly, when the winding 71 is operated to drive the tape, the corresponding brake coil will be deenergized to permit the tape to move, and, when the winding 71 is deenergized to cease driving of the tape, the corresponding brake coil in the circuit 198 will be energized to grip the tape and prevent its movement.

As previously described, as "resume read" control circuit (FIG. 9) is provided herein to effect resumption of driving of the tape after a predetermined time interval following the sensing of a stop signal on the tape and the consequent halting of movement of the tape.

The "resume read" control circuit, shown generally in FIG. 10, may be connected into the operating circuitry of the tape-handling means by connecting a terminal 184 to the terminal 184A in the bistable circuit 160, and also connecting terminals 255 and 256 to corresponding terminals 255A and 256A on the conductor 197 in FIG. 9B.

In the "resume read" control circuit, the terminal 256 is connected over a 1,000-ohm resistor 259, in series with a 1-megohm potentiometer 260, to a point 261 while the terminal 255 is connected to the point 261 over a diode 262, of type 1N128. A 100-ohm resistor 263 couples the point 261 to a point 264 of the base circuit of a transistor 265, of type PNP 2N113. The point 264 is also connected over a 1-microfarad capacitor 266 to a base reference potential, shown here as ground.

The emitter of the transistor 265 is connected to a terminal 267, to which is applied a −3-volt source of potential, while the collector of said transistor is connected over a 3,900-ohm resistor 268 to a point 269 of the base circuit of a transistor 270, of NPN type 2N385. The point 269 is also connected over a 100,000-ohm resistor 271 to a terminal 272, to which a −6-volt source of potential is applied.

A −4.5-volt potential is applied to the emitter of the transistor 270 from the terminal 273, while the collector of said transistor is connected over a 1,600-ohm resistor 274, a point 275, and a 100,000-ohm resistor 276 to a terminal 277, to which is applied a +3-volt source of potential. The point 275 is also on the base circuit of a transistor 278, of PNP type 2N113, whose emitter is connected to a base reference potential, shown here as ground. The collector of the transistor 278 is connected over a switch 279 to the terminal 184A of the circuit of FIG. 10. The switch 279 is provided merely for convenience in connecting and disconnecting the circuit of FIG. 10 to and from the remainder of the tape-handling circuit, and is not esesntial to operation of the device.

The operation of the "resume read" control circuit will now be described. Prior to the sensing of a stop signal from the tape, the conductor 197, extending from the bistable circuit 160 to the brake circuit 198, is at approximately zero volt potential, and the base of the transistor 265 is accordingly also at approximately zero volts potential. Since the emitter of the transistor 265 is at −3 volts potential, said transistor is not conducting, and no collector current flows.

As a consequence, the transistor 270 is also in non-conducting condition, since its base is directly connected to the collector of the transistor 265 over the resistor 268. The base of the transistor 270 is at this time at a potential of −6 volts, due to the voltage applied to the terminal 272, while its emitter is at a potential of −4.5 volts, due to the potential applied at the terminal 273, which, of course, results in the non-conducting condition of the transistor 270.

Since the transistor 270 is not conducting, its collector is not drawing any current, and the base of the transistor 278, which is coupled to the collector of the transistor 270 over the resistor 274, as a consequence is at a potential of +3 volts, under the influence of the potential applied to the terminal 277. Since the emitter of the transistor 278 is grounded, this transistor is non-conducting, and the collector circuit of the transistor 278, which is connected over the normally closed switch 279 to the terminal 184A, coupled in turn to the terminal 184, has no effect on the bistable circuit 160.

When a stop signal is sensed by the photodiodes 48 of the upper three channels of FIG. 9A, and the bistable circuit 160 is accordingly triggered in the manner previously described, the input potential applied to the point 264 on the base circuit of the transistor 265 from the terminals 255 and 256 shifts from zero toward −10 volts at an exponential rate, due to the time constant of the resistors 259, 260, and 263, along with the capacitor 266. This shift is with respect to time, and does not reach −10 volts, since, when the base of the transistor 265 reaches a potential which is slightly more negative than −3 volts, the transistor 265 commences conducting, and the base of said transistor clamps itself at approximately −3.5 volts.

Conduction in the transistor 265 causes current to flow in its collector circuit, and accordingly causes the base potential of the transistor 270 to shift from −6 volts to approximately −4.1 volts, which makes the base potential of the transistor 270 more positive than its emitter potential, which is −4.5 volts, and causes conduction in said transistor. This in turn causes collector current to flow in the collector circuit of the transistor 270 and results in the potential in the base circuit of the transistor 278, which is coupled to the collector circuit of the transistor 270, shifting to −0.4 volt. Since the emitter of the transistor 278 is grounded, this shift in base potential is effective to cause conduction in said transistor, which causes the potential of the collector circuit of the transistor 278 to drop from −10 volts to approximately zero volts potential.

This shift in collector potential of the transistor 278 is applied over the closed switch 279, the terminal 184A, and the terminal 184 to the bistable circuit 160, to trigger the circuit 160, so that the transistor 162 is made to conduct, while the transistor 162 is cut off. As a result of this triggering, signals applied over the conductors 195 and 197 to the driving circuit 196 and the brake circuit 198 cause the brake to be rendered ineffective, while the driving means is engaged, and the tape accordingly resumes its movement.

As the circuit 160 is triggered, and the conductor 197 as a consequence shifts in potential from −10 volts to zero, the relative polarities are such as to cause the diode 262 to conduct, thereby effecting a shift of potential of point 264 toward zero potential. The capacitor 266 is thereby caused to discharge through the 100-ohm resistor 263, which limits the discharge current of the capacitor so as to prevent damage to the diode 262. Also, the reduction of potential at the point 264 causes the transistor 265 to be turned off, which in turn is effective to turn off the transistor 270 and the transistor 278. The circuit of FIG. 10 is thus returned to its initial condition, in which it is ready to initiate another "resume read" order following the next triggering of the bistable circuit 160 in response to reading of a stop signal from the tape.

*Typical Operation*

The manner in which the tape-handling apparatus of the present invention functions is thought to be clear from the preceding description. However, a brief explanation of the mode of operation will now be given, setting forth the sequence of operation of the various components of the tape-handling means.

Let it be assumed, for purposes of illustration, that the tape is being driven by the tape-handling means, and that each character position of each channel on the tape is being sensed as it passes the reading station by the photodiode 48 for the particular channel. Information is thus picked up from the tape as an electrical impulse, which is shaped by the circuit 120 for each channel and is then transmitted to a utilizing device.

As previously stated, in the illustrated embodiment, a stop signal is encoded on the tape by perforations in the three upper channels, as shown in FIG. 9A. When a stop signal is sensed at the reading station of the tape-handling device, the electrical impulses which are generated thereby in the upper three channels (FIG. 9A) are shaped by the circuits 120 and fed over the conductors 150 to the gating means of FIG. 9B. An electrical impulse is accordingly applied over the conductor 156 to the bistable circuit 160, to trigger said circuit. This is effective to send impulses over the conductors 195 and 197 to the tape drive operating circuit 196 (FIG. 9C) and the brake-operating circuit 198 (FIG. 9C).

In the manner previously described, the impulse applied to the tape drive operating circuit 196 is effective to deenergize the winding 71 of said circuit and thereby decrease the pressure of the element 63 (FIG. 1) or the element 301 (FIG. 7), depending upon which of the illustrated embodiments is employed, on the tape 20. At the same time, the signal applied on a conductor 197 to the brake-operating circuit 198 is effective to energize the brake coils and operate the brake 23 (FIG. 1) to halt movement of the tape.

Once the tape has been halted, a "resume read" command may come either from the utilizing device, if desired, or from a "resume read" command circuit, such as the circuit disclosed in FIG. 10 of the drawings of the present application. If the circuit of FIG. 10 is utilized, a signal will be applied, after an appreciable interval of time, to the terminal 184 of the bistable triggering circuit 160, to cause said circuit to trigger back to the condition in which it existed prior to the application of a stop signal to said circuit.

This re-triggering action of the bistable circuit 160, which may be caused either by a "resume read" command from the utilizing device or by an impulse from the circuit of FIG. 10, is effective to cause impulses to be transmitted over the conductors 195 and 197 to the tape drive operating circuit 196 and the brake operating circuit 198, respectively. These signals are effective, in the manner previously described, to energize the winding 71, while simultaneously deenergizing the brake coil of the circuit 198. The effect of this, of course, is to release the brake 23 and increase the engagement of the element 63 or 301 with the tape 20, so that an almost instantaneous resumption of tape movement takes place. The tape 20 then continues to be driven until the next stop signal is sensed from the tape. It is, of course, obvious that, if desired, a tape stop signal could be supplied from a utilizing device, rather than being read from the tape. Such a signal would be applied to the point 159 in the circuit 160 and would have the same effect as a signal applied to the point 159 from the gating means of FIG. 9B.

While the forms of the invention shown and described herein are admirably adapted to fulfill the objects primarily stated, it is to be understood that it is not intended to confine the invention to the forms or embodiments disclosed herein, for the invention is susceptible of embodiment in various other forms.

What is claimed is:

1. In a record media handling apparatus for controlling the movement of record media, the combination comprising a first continuously driven rotating rigid cylindrical element having a cylindrical surface normally engaging one side of the record media; a second continuously driven rotating rigid cylindrical element having a cylindrical surface normally engaging the other side of the record media, the two cylindrical elements cooperating to apply a predetermined urging force to the record media which is insufficient to drive said media; control means positioned within the cylindrical surface of the first continuously driven rotating rigid cylindrical element, rotatable therewith, and effective when energized to cause movement of the cylindrical surface of the second rigid cylindrical element toward the cylindrical surface of the first rigid cylindrical element to squeeze the record media between the two cylindrical surfaces, thereby frictionally imparting to the record media the combined driving force of the two driving means to drive the record media; and an operating circuit capable of operating said control means to effect rapid starting of record media movement.

2. In a record media handling apparatus for controlling the movement of record media, the combination comprising a first continuously driven rotating rigid cylindrical element having a cylindrical surface normally engaging one side of the record media; a second continuously driven rotating rigid cylindrical element having a cylindrical surface normally engaging the other side of the record media; means to adjust the position of the second continuously driven rotating rigid cylindrical element with respect to the first continuously driven rotating rigid cylindrical element; and control means positioned within the cylindrical surface of the first continuously driven rotating rigid cylindrical element, rotatable therewith, and effective when energized to cause movement of the cylindrical surface of the second rigid cylindrical element toward the cylindrical surface of the first rigid cylindrical element to squeeze the record media between the two cylindrical surfaces, thereby frictionally imparting to the record media the combined driving force of the two rigid cylindrical elements.

3. In a record media handling apparatus for controlling the movement of record media, the combination comprising a first continuously driven rotating rigid cylindrical element having a cylindrical surfame normally engaging one side of the record media; a second continuously driven rotating rigid cylindrical element having a cylindrical surface normally engaging the other side of the record media; and control means positioned within the cylindrical surface of the first continuously driven rotating rigid cylindrical element, rotatable therewith, and effective when energized to cause movement of the cylindrical surface of the second rigid cylindrical element toward the cylindrical surface of the first rigid cylindrical element to squeeze the record media between the two cylindrical surfaces, thereby frictionally imparting to the record media the combined driving force of the two rigid cylindrical elements.

4. In a record media handling apparatus for controlling the movement of record media, the combination comprising first continuously rotating driving means having a surface normally engaging one side of the record media; second continuously rotating driving means of magnetic material in annular configuration having a first surface normally engaging the other side of the record media and a second surface engaging a driving element for imparting rotational movement to said second driving means; control means forming a part of the first driving means and effective, when energized, to cause movement of the first surface of the second driving means toward the surface of the first driving means to squeeze the record media between the two surfaces, thereby frictionally imparting to the record media the combined driving force of the two driving means; and operating circuit means capable of operating the control means in response to a signal, thus effecting rapid starting movement of the record media.

5. In a record media handling apparatus for controlling the movement of record media, the combination comprising first continuously rotating driving means having a cylindrical surface normally engaging one side of the record media; second continuously rotating driving means of magnetic material in annular configuration having an outer cylindrical surface and an inner surface engaging a driving element for imparting rotational movement to said second driving means; guide means to maintain the outer cylindrical surface of the second driving means adjacent to the other side of the record media; adjustable means to vary the engagement of the second driving means on the record media; and electromagnetic control means integral with the first driving means and effective, when energized, to cause movement of the cylindrical surface of the second driving means toward the cylindrical surface of the first driving means to equeeze the record media between the two cylindrical surfaces, thereby frictionally imparting to the record media the combined driving force of the two driving means.

6. In a record media handling apparatus for controlling the movement of record media, the combination comprising first continuously rotating driving means having a cylindrical surface normally engaging one side of the record media; second continuously rotating driving means of magnetic material in annular configuration having an outer cylindrical surface and an inner cylindrical surface; a driving element of cylindrical configuration smaller in diameter than the inner surface of the second driving means and engaging the inner surface of said second driving means to continuously drive said second driving means, said driving element also supporting said second driving means in position and being so located that said second driving means is urged by the force of gravity to a position in which its outer surface engages the other side of the record media; and electromagnetic control means integral with the first driving means and effective, when energized, to cause movement of the second driving means about its pivotal support on the driving element toward the cylindrical surface of the first driving means to squeeze the record media between the two cylindrical surfaces, thereby frictionally imparting to the record media the combined driving force of the two driving means.

7. In a record media handling apparatus for controlling the movement of record media, the combination comprising first continuously rotating driving means having a cylindrical surface normally engaging one side of the record media; second continuously rotating driving means of magentic material in annular configuration having an outer cylindrical surface and an inner surface; a driving element engaging the inner surface of said second driving means to continuously drive said second driving means, said driving element also supporting said second driving means in position and being so located that said second driving means is urged by the force of gravity to a position in which its outer surface engages the other side of the record media; and electromagnetic control means integral with the first driving means and effective, when energized, to cause movement of the outer cylindrical surface of the second driving means toward the cylindrical surface of the first driving means to squeeze the record media between the two cylindrical surfaces, thereby frictionally imparting to the record media the combined driving force of the two driving means.

8. In a record media handling apparatus for controlling the movement of record media, the combination comprising first continuously rotating driving means having a cylindrical surface normally engaging one side of the record media; second continuously rotating driving means of magnetic material in annular configuration having an outer cylindrical surface normally engaging the other side of the record media and an inner surface engaging a driving element for imparting rotational movement to the second driving means; an adjustable supporting member for mounting said driving element, said adjustable supporting member being shiftable to vary the position of said second driving means with respect to said first driving means; and electromagnetic control means integral with the first driving means and effective, when energized, to cause movement of the cylindrical surface of the second driving means toward the cylindrical surface of the first driving means to squeeze the record media between the two cylindrical surfaces, thereby frictionally imparting to the record media the combined driving force of the two driving means.

9. In a record media handling apparatus for controlling the movement of record media, the combination comprising first continuously rotating driving means having a cylindrical surface normally engaging one side of the record media; second continuously rotating driving means of magnetic material in annular configuration having an outer cylindrical surface and an inner surface engaging a driving element for imparting rotational movement to said second driving means; guide means to maintain the outer cylindrical surface of the second driving means adjacent to the other side of the record media; and electromagnetic control means integral with the first driving means and effective, when energized, to cause movement of the cylindrical surface of the second driving means toward the cylindrical surface of the first driving means to squeeze the record media between the two cylindrical surfaces, thereby frictionally imparting to the record media the combined driving force of the two driving means.

10. In a record media handling apparatus for controlling the movement of record media, the combination comprising first continuously rotating driving means having a surface normally engaging one side of the record media; second continuously rotating driving means of magnetic material in annular configuration having a first surface normally engaging the other side of the record media and a second surface engaging a driving element for imparting rotational movement to said second driving means; and electromagnetic control means integral with the first driving means and effective, when energized, to cause movement of the first surface of the second driving means toward the surface of the first driving means to squeeze the record media between the two surfaces, thereby frictionally imparting to the record media the combined driving force of the two driivng means.

11. In a record media handling apparatus for controlling the movement of record media, the combination comprising first continuously rotating driving means having a cylindrical surface normally engaging one side of the record media; second continuously rotating driving means having a cylindrical surface normally engaging the other side of the record media; a frame for supporting said second driving means from a remote pivot for rockable movement about the axis of the pivot; control means forming a part of the first driving means and effective, when energized, to cause movement of the cylindrical surface of the second driving means toward the cylindrical surface of the first driving means to squeeze the record media between the cylindrical surfaces, thereby frictionally imparting to the record media the combined driving force of the two driving means; and operating circuit means capable of operating the control means in response to a signal, thus effecting rapid starting movement of the record media.

12. In a record media handling apparatus for controlling the movement of record media, the combination comprising first continuously rotating driving means having a cylindrical surface normally engaging one side of the record media; second continuously rotating driving means having a cylindrical surface normally engaging the other side of the record media; a frame for supporting said second driving means from a remote pivot for rockable movement about the axis of the pivot; an element of said frame extending beyond the pivot in the opposite direction from said second driving means; counter-balancing means mounted on said element for providing the correct engagement of the second driving means with the record media; and control means positioned within the cylindrical surface of the first continuously rotating driving means, rotatable therewith, and effective when energized to cause movement of the cylindrical surface of the second driving means toward the cylindrical surface of the first driving means to squeeze the record media between the two cylindrical surfaces, thereby frictionally imparting to the second media the combined driving force of the two driving means.

13. In a record media handling apparatus for controlling the movement of record media, the combination comprising first continuously rotating driving means having a cylindrical surface normally engaging one side of the record media; second continuously rotating driving means having a cylindrical surface normally engaging the other side of the record media; a frame for supporting said second driving means from a remote pivot for rockable movement about the axis of the pivot; means to adjust the position of the second driving means with respect to the first driving means; and control means positioned within the cylindrical surface of the first continuously rotating driving means, rotatable therewith, and effective when energized to cause movement of the cylindrical surface of the second driving means toward the cylindrical surface of the first driving means to squeeze the record media between the two cylindrical surfaces, thereby frictionally imparting to the record media the combined driving force of the two driving means.

14. In a record media handling apparatus for controlling the movement of record media, the combination comprising first continuously rotating driving means having a cylindrical surface normally engaging one side of the record media; second continuously rotating driving means having a cylindrical surface normally engaging the other side of the record media; a frame for supporting said second driving means from a remote pivot for rockable movement about the axis of the pivot; and control means positioned within the cylindrical surface of the first continuously rotating driving means, rotatable therewith, and effective, when energized, to cause movement of the cylindrical surface of the second driving means toward the cylindrical surface of the first driving means to squeeze the record media between the two cylindrical surfaces, thereby frictionally imparting to the record media the combined driving force of the two driving means.

References Cited in the file of this patent

UNITED STATES PATENTS

| | | |
|---|---|---|
| 2,831,678 | MacNeill | Apr. 22, 1958 |
| 2,921,736 | Hatherell et al. | Jan. 19, 1960 |
| 2,928,596 | Sims et al. | Mar. 15, 1960 |
| 2,943,852 | Quirk | July 5, 1960 |
| 2,953,369 | Goldberg et al. | Sept. 29, 1960 |
| 3,002,671 | Brumbaugh et al. | Oct. 3, 1961 |

FOREIGN PATENTS

| | | |
|---|---|---|
| 716,229 | Great Britain | Sept. 29, 1954 |

UNITED STATES PATENT OFFICE
CERTIFICATE OF CORRECTION

Patent No. 3,158,305                                                  November 24, 1964

Cebern B. Trimble

It is hereby certified that error appears in the above numbered patent requiring correction and that the said Letters Patent should read as corrected below.

Column 2, line 51, for "construted" read -- construed --; column 7, line 51, for "fied" read -- fixed --; column 11, line 36, for "nagative" read -- negative --; column 12, line 23, for "transistor" read -- transistors --; line 36, strike out "5,100-ohm resistor 202 to a ter-" and insert instead -- conductor 195 to a drive-operating --; column 13, line 3, for "termnial" read -- terminal --; column 15, line 7, for "as" read -- a --; line 49, for "esesntial" read -- essential --; column 18, line 31, for "surfame" read -- surface --; column 19, line 5, for "equeeze" read -- squeeze --; column 20, line 32, for "driivng" read -- driving --; same column 20, line 72, for "second" read -- record --.

Signed and sealed this 13th day of April 1965.

(SEAL)
Attest:

ERNEST W. SWIDER                                  EDWARD J. BRENNER
Attesting Officer                               Commissioner of Patents